(12) United States Patent
Klocek et al.

(10) Patent No.: US 6,456,765 B1
(45) Date of Patent: Sep. 24, 2002

(54) APPARATUS FOR SEPARATING AND/OR COMBINING OPTICAL SIGNALS, AND METHODS OF MAKING AND OPERATING IT

(75) Inventors: Paul Klocek; James M. Florence; David H. Rester, all of Dallas; John A. Tejada, Garland, all of TX (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/846,102

(22) Filed: Apr. 30, 2001

(51) Int. Cl.[7] ................................................ G02B 6/26
(52) U.S. Cl. ........................................................ 385/42
(58) Field of Search ............................ 385/24, 27, 37; 359/130, 578, 566

(56) References Cited

U.S. PATENT DOCUMENTS

| 4,474,427 A | * | 10/1984 | Hill et al. ................... 359/578 |
| 4,900,119 A | * | 2/1990 | Hill et al. ................... 385/27 |
| 5,016,967 A | * | 5/1991 | Meltz et al. ................. 385/37 |
| 5,216,739 A | * | 6/1993 | Hill et al. ................... 359/566 |
| 5,271,024 A | * | 12/1993 | Huber ......................... 359/130 |
| 5,309,260 A | * | 5/1994 | Mizrahi et al. .............. 359/24 |
| 5,805,751 A | | 9/1998 | Kewitsch et al. |
| 5,875,272 A | | 2/1999 | Kewitsch et al. |

* cited by examiner

Primary Examiner—Akm E. Ullah
(74) Attorney, Agent, or Firm—Baker Botts L.L.P.

(57) ABSTRACT

An apparatus for processing optical signals includes a cladding material having therein at least two elongate core regions which serve as respective waveguides. A coupling portion therein includes adjacent and parallel portions of the two waveguides which extend sufficiently closely for a sufficient distance to permit coupling of radiation between these waveguide portions. Structure is provided that respectively permits and frustrates such coupling for respective component signals having respective different wavelengths. The coupling portion may optionally include an externally controlled switching section that can have a selected one of two states in which is respectively transmissive and non-transmissive to radiation.

24 Claims, 4 Drawing Sheets

FIG. 13

APPARATUS FOR SEPARATING AND/OR COMBINING OPTICAL SIGNALS, AND METHODS OF MAKING AND OPERATING IT

TECHNICAL FIELD OF THE INVENTION

This invention relates in general to communication with optical signals and, more particularly, to a method and apparatus for facilitating communication using optical signals which include multiple signal components that each have a respective different wavelength.

BACKGROUND OF THE INVENTION

Telecommunications is a field which has been rapidly evolving over the past twenty years, fueled in part by the progressively increasing popularity of technologies such as cellular telephones, facsimile machines, and computer communications that use the Internet. Due to these growing new technologies, there has been a progressively increasing demand for telecommunications equipment with greater information-carrying capacity, which in turn has created a progressively increasing focus on effecting communications through the use of optical signals.

Through use of existing techniques such as dense wavelength division multiplexing (DWDM), a single optical fiber in a telecommunications system will frequently be carrying many component optical signals at respective different wavelengths, and each such component optical signal will be a time division multiplexed (TDM) signal that carries a number of separate telephone conversations or other ongoing communications. To the extent that optical signals are being used in this manner to transmit large amounts of information, techniques are needed for efficiently and cheaply processing optical signals, including demultiplexing of optical signals, multiplexing of optical signals, and switching of optical signals.

Many existing techniques for processing optical signals involve assemblies which are complex and which present difficult alignment problems that can produce relatively high optical losses. Other systems convert the optical data into electrical signals, subsequently carry out processing of the electrical signals to effect steps such as multiplexing, demultiplexing and switching, and then convert the electrical signals back into optical signals. The equipment used to effect these conversions introduces a significant delay into handling of the signals. All of these approaches are relatively expensive.

Some consideration has been given to fusing optical fibers in order to eliminate certain coupling or collimating optics, but the resulting devices are generally difficult to produce. Consideration has also been given to optical switches that use liquid crystals, bubbles, or micro-electro-optomechanical devices (MEMS), but these arrangements have relatively slow response times, on the order of a few milliseconds, and typically require a number of optical components that make them relatively complex and expensive, and that tend to result in relatively high optical losses.

SUMMARY OF THE INVENTION

From the foregoing, it may be appreciated that a need has arisen for a method and apparatus for processing optical signals, which avoid at least some of the problems discussed above. According to a first from of the present invention, a method and apparatus are provided to address this need, and involve first and second waveguides, and a coupling portion operable to cause radiation at a first wavelength which is traveling in a direction of travel through the first waveguide and which reaches the coupling portion to be routed so as to be traveling in one of the first and second waveguides when exiting the coupling portion, and to cause radiation at a second wavelength different from the first wavelength which is traveling through the first waveguide in the direction of travel and which reaches the coupling portion to be routed so as to be traveling in the other of the first and second waveguides when exiting the coupling portion. The coupling portion includes the first and second waveguides respectively having first and second portions that extend approximately parallel to each other and that are sufficiently close for a sufficient distance to permit coupling therebetween of radiation having at least one of the first and second wavelengths, and includes structure operable along at least part of the distance to frustrate coupling between the first and second portions of radiation having one of the first and second wavelengths while permitting coupling between the first and second portions of radiation having the other of the first and second wavelengths.

According to another form of the invention, a method involves: providing a first layer made of a material which has a first index of refraction; forming on the first layer first and second elongate sections made of a second material which is transmissive to radiation of a predetermined wavelength and which has a second index of refraction different from the first index of refraction; and forming over the elongate sections and exposed portions of the first layer a third layer made of a material which has a third index of refraction different from the second index of refraction, wherein the elongate sections function as cores of respective waveguides, and the materials of the first and second layers function as cladding for the cores.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
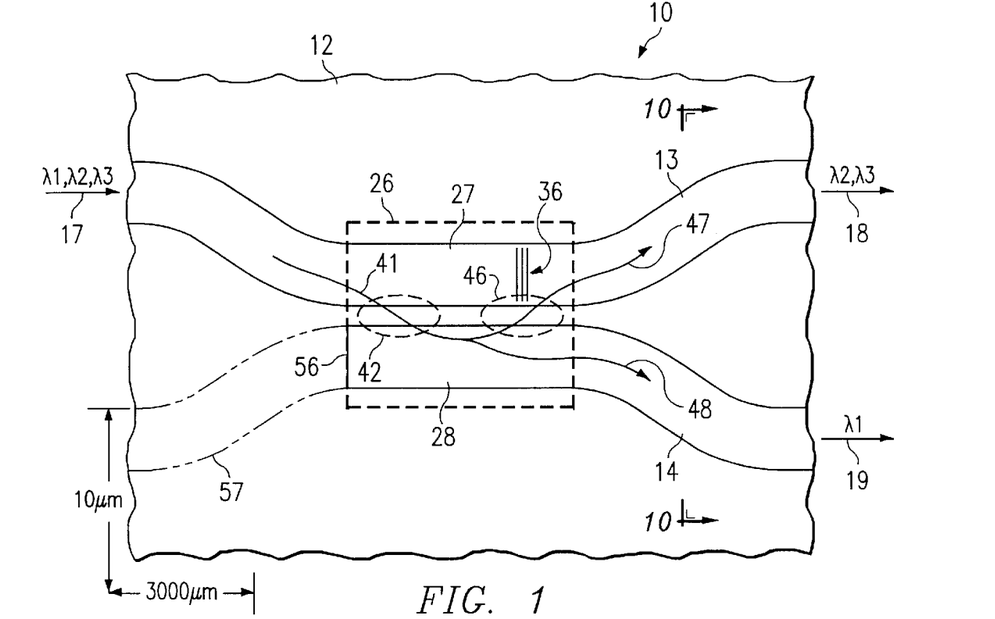
FIG. 1 is diagrammatic fragmentary top view of an apparatus which embodies the present invention, and which processes optical signals.

FIG. 1 is a diagrammatic fragmentary top view of an apparatus 10 which embodies the present invention. Although FIG. 1 is diagrammatic and thus not to scale, it is nevertheless appropriate to specifically point out that there is a significant difference between the scale of the units for vertical and horizontal dimensions in FIG. 1, as evident from the exemplary dimensions indicated by double-headed arrows in the lower left portion of FIG. 1. Also, the apparatus 10 has dimensions and indices of refraction which are selected to facilitate use with near infrared radiation of the type commonly used in the telecommunications industry. However, it will be recognized that the present invention is not limited to the infrared portion of the electromagnetic spectrum.

The apparatus 10 includes a cladding material 12, which has embedded in it two elongate segments 13 and 14 made of a core material. The cladding material 12 has an index of refraction which is different from the index of refraction of the core material used for the segments 13 and 14, such that the segments 13 and 14 each function as a respective waveguide for radiation. Although the cross-sectional shape of the segments 13 and 14 is not visible in FIG. 1, these segments each have a cross-sectional shape which is approximately a square.

Technically, the cladding material 12 is needed in combination the core material of either segment 13 or segment 14 in order to define a waveguide. For convenience, however, the following discussion will refer to each of the segments 13 and 14 as a waveguide, without specifically referring to the associated cladding material 12.

The apparatus 10 of FIG. 1 functions as a passive optical demultiplexer, which may also be referred to as an optical drop multiplexer. In this regard, the arrow 17 at the left of FIG. 1 represents an optical input signal which is supplied to the waveguide 13, and which includes three optical component signals at respective wavelengths of $\lambda 1$, $\lambda 2$ and $\lambda 3$. This signal may, for example, be a signal of the type which is known in the art as a dense wavelength division multiplexing (DWDM) signal. Although the signal at 17 is described here for convenience as having three component signals, it will be recognized that it could have a larger or smaller number of component signals.

The apparatus 10 separates the component signal at wavelength $\lambda 1$ from the component signals at all other wavelengths, in a manner described below, so that the component signal with wavelength $\lambda 1$ is routed to travel through the waveguide 14, as indicated by arrow 19, while the other component signals with wavelengths $\lambda 2$ and $\lambda 3$ are both routed to continue traveling through the waveguide 13, as indicated by arrow 18.

In more detail, the apparatus 10 includes a portion 26 which is referred to as a coupling portion, and which is identified diagrammatically by a broken line in FIG. 1. The waveguides 13 and 14 each have a respective portion which is disposed within the coupling portion 26, and these portions are respectively identified by reference numerals 27 and 28 in FIG. 1. It will be noted that the waveguides 13 and 14 are routed so that the portions 27 and 28 thereof extend parallel to each other, and are relatively close to each other. In contrast, the remaining portions of the waveguides 13 and 14 in FIG. 1 are spaced from each other by greater distances.

The portions 27 and 28 of the waveguides are parallel and sufficiently close for a sufficient distance so that radiation traveling through either of the waveguides 13 and 14 will tend to be coupled over in the other thereof, and then back into the original waveguide. Although there is a small amount of the cladding material 12 disposed between the portions 27 and 28 of the waveguides, it is not enough to have any significant effect in preventing radiation from passing between the portions 27 and 28. In fact, by appropriate selection of the distance that portions are adjacent, and the spacing between them, 100% of the radiation in waveguide 13 will be coupled over into waveguide 14, and then back into waveguide 13.

A Bragg grating 36 is provided within the waveguide 13, at a location three-quarters of the way along the portion 27 in the direction of travel of radiation through the waveguide 13. The grating 36 is of a known type, and in the embodiment of FIG. 1 is configured so as to be nontransmissive to radiation at wavelength $\lambda 1$, and transmissive to radiation at other wavelengths.

Consequently, as the optical signal with components at respective wavelengths $\lambda 1$, $\lambda 2$ and $\lambda 3$ is traveling through the waveguide 13, as indicated at 41, the components at all wavelengths are coupled at 42 to cross from the waveguide 13 over into the waveguide 14. Due to the lengths of the portions 27 and 28, these components would all normally tend to be subsequently coupled to cross at 46 from the waveguide 14 back into the waveguide 13. However, as noted above, the grating 36 is nontransmissive to radiation at wavelength $\lambda 1$, but is transmissive to other wavelengths. Consequently, the grating 36 is effectively transparent to the signal components at wavelengths $\lambda 2$ and $\lambda 3$, and these components are coupled to cross at 46 from the waveguide 14 back into the waveguide 13, where at 47 they continue propagating through the waveguide 13.

In contrast, since the Bragg grating 36 is nontransmissive to the signal component at wavelength $\lambda 1$, the grating 36 frustrates coupling at 46 for the component at wavelength $\lambda 1$, and this component therefore does not cross from the waveguide 14 back into the waveguide 13, but instead continues traveling through the waveguide 14, as indicated at 48. Consequently, at the right side of FIG. 1, arrow 18 indicates that the signal components with wavelengths $\lambda 2$ and $\lambda 3$ end up traveling through the waveguide 13, whereas arrow 19 indicates that the signal component at wavelength $\lambda 1$ ends up traveling through the waveguide 14.

The waveguide 14 is depicted in FIG. 1 as having an end surface at 56, which represents the beginning of the portion 28 of the waveguide 14 within the coupling portion 26. However, it would be possible for the waveguide 14 to include a further portion, which extends off to the left of the portion 28 thereof, as indicated diagrammatically by a broken line at 57. However, this further portion 57 would not affect the operation of the apparatus 10.

Figure 2:
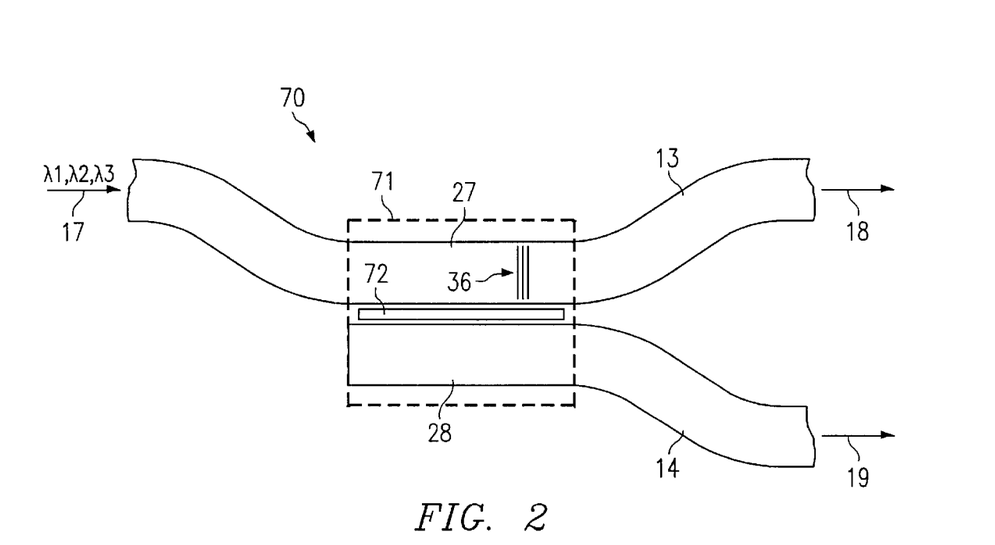
FIG. 2 is a diagrammatic fragmentary top view of an apparatus which is an alternative embodiment of the apparatus of FIG. 1.

FIG. 2 is a diagrammatic fragmentary top view of an apparatus 70 which is an alternative embodiment of the apparatus 10 of FIG. 1. The apparatus 70 includes all of the structure from the apparatus 10, and the same reference numerals are used to designate certain components which are identical. The apparatus 70 includes cladding material which is equivalent to that shown at 12 in FIG. 1, but this cladding material has been omitted from FIG. 2 for clarity.

The only significant difference between the apparatus 70 of FIG. 2 and the apparatus 10 of FIG. 1 is that the apparatus 70 includes a coupling portion 71 which is different from the coupling portion 26 of the apparatus 10. In particular, the coupling portion 71 includes a region 72 which is disposed between the portions 27 and 28 of the waveguides 13 and 14, and which contains a liquid crystal material. The liquid crystal region 72 serves as a switching section, and can be selectively switched between two states in a known manner by a not-illustrated control circuit of a known type. In each of these two states, the liquid crystal region 72 has a respective different index of refraction. As a result, the liquid crystal region 72 is respectively transmissive and nontransmissive to all wavelengths of interest in these respective states. Although the region 72 is a liquid crystal material in the disclosed embodiment, it could alternatively be some other electro-optic switching material, such as lithium niobate. If a lithium niobate was used for the switching section 72, the switching section could provide a response time on the order of one microsecond, or faster.

When the liquid crystal region 72 is in the state where it is transmissive, coupling is possible between the portions 27 and 28 of the waveguides 13–14, and the apparatus 70 functions in precisely the same manner as described above for the apparatus 10 of FIG. 1. In particular, if an optical input signal 17 includes three components at respective wavelengths $\lambda 1$, $\lambda 2$ and $\lambda 3$, the coupling portion 71 will effect routing of these components in a manner so that the component at wavelength $\lambda 1$ ends up traveling through waveguide 14, as indicated by arrow 19, and the components at wavelengths $\lambda 2$ and $\lambda 3$ end up traveling through the waveguide 13, as indicated by arrow 18.

On the other hand, if the liquid crystal region 72 is set to the state where it is nontransmissive to all wavelengths of interest, the components of signal 17 at all wavelengths $\lambda 1$, $\lambda 2$ and $\lambda 3$ will be prevented from being coupled from the portion 27 over to the portion 28. They will therefore all attempt to continue propagating through the portion 27 of the waveguide 13. Since the grating 36 is transmissive to the components at wavelengths $\lambda 2$ and $\lambda 3$, they will continue traveling through the waveguide 13, as indicated by arrow 18. But since the grating 36 is nontransmissive to the component at wavelength $\lambda 1$, this component will not continue traveling along the waveguide 13, and also cannot enter the waveguide 14, because of the current state of the liquid crystal region 72. Therefore, the component at wavelength $\lambda 1$ will not propagate rightwardly through either of the waveguides 13 and 14, and thus will not appear at either 18 or 19. Instead, it will be reflected and travel back through the waveguide 13 in the opposite direction, or in other words to the left in FIG. 2.

Summarizing, the components at wavelengths $\lambda 2$ and $\lambda 3$ will always be routed through the waveguide 13, regardless of which state the liquid crystal region 72 is in, and will always appear at 18. Further, the component at wavelength $\lambda 1$ will always be separated out from other components, but will only continue propagating through waveguide 14 and appear at 19 when the liquid crystal region 72 is in its transmissive state. The component at wavelength $\lambda 1$ will not appear at either of the outputs 18 or 19 when the liquid crystal region 72 is in its nontransmissive state. Thus, the apparatus 70 of FIG. 2 not only separates the component at wavelength $\lambda 1$ from components at other wavelengths, but also serves as a switch which can enable and disable transmission of the component at wavelength $\lambda 1$ to an output of the apparatus 70.

In a possible variation of the apparatus of FIG. 2, which is not separately illustrated, the left half of the liquid crystal region 72 in FIG. 2 would be omitted. In that case, radiation components at all wavelengths would be coupled from the portion 27 of the waveguide 13 over into the portion 28 of the waveguide 14. The component at wavelength $\lambda 1$ will then always continue on through the waveguide 14 so as to appear at 19, because the grating 36 would prevent it from ever being coupled back into the waveguide 13 under any circumstances.

If the modified liquid crystal region 72 was in its transmissive state, the components at wavelengths $\lambda 2$ and $\lambda 3$ would be coupled from the portion 28 back into the portion 27, and would then continue through waveguide 13 so as to appear at 18, in a manner comparable to that described above in association with FIG. 1. In contrast, if the modified liquid crystal region 72 was in its nontransmissive state, the components at wavelengths $\lambda 2$ and $\lambda 3$ would be prevented from being coupled from the portion 28 back into the portion 27, and would instead continue on through the waveguide 14 with the component at wavelength $\lambda 1$, so that all three components would appear together at 19.

Figure 3:
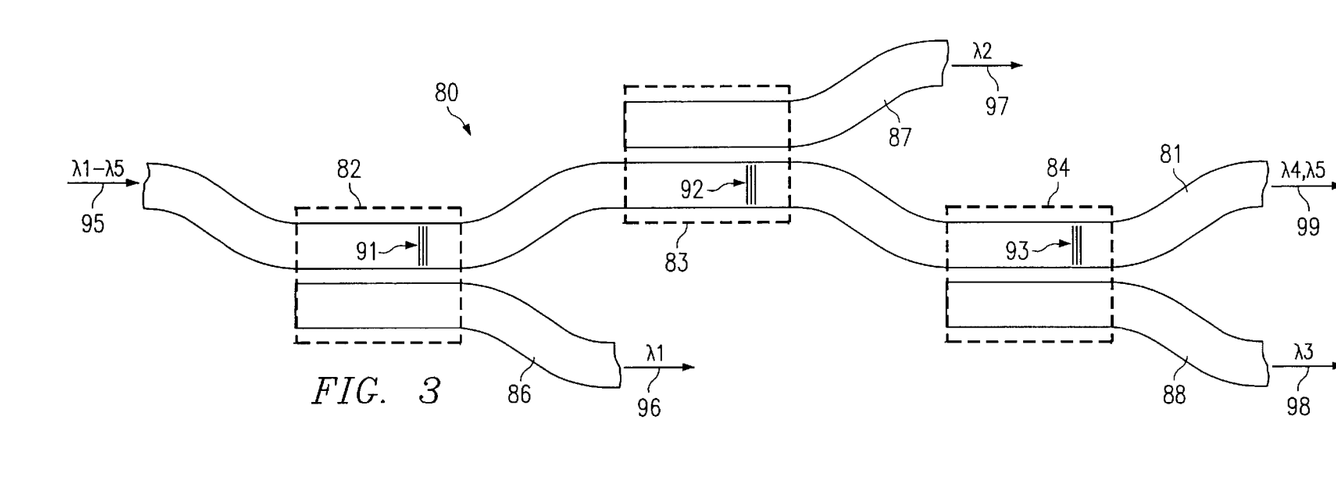
FIG. 3 is a diagrammatic fragmentary top view of an apparatus which is a further alternative embodiment of the apparatus of FIG. 1.

FIG. 3 is a diagrammatic fragmentary top view similar to FIG. 1, but showing an apparatus 80 which is still another alternative embodiment of the apparatus 10. The apparatus 80 includes cladding material comparable to that shown at 12 in FIG. 1, but this cladding material has been omitted in FIG. 3 for clarity. The apparatus 80 shows how several arrangements of the type shown in FIG. 1 can be cascaded in series.

In particular, the apparatus 80 includes a main waveguide 81, which has three coupling portions 82–84 at spaced locations along the length thereof. Each of the coupling portions 82–84 is structurally and functionally equivalent to the coupling portion which is shown at 26 in FIG. 1. The apparatus 80 includes three further waveguides 86–88, which each are associated with a respective one of the coupling portions 82–84. The coupling portions 82–84 each include one of three Bragg gratings 91–93, which are disposed within the main waveguide 81 at spaced locations therealong.

The gratings 91–93 are configured to affect respective different wavelengths. In particular, the grating 91 is configured to be nontransmissive to radiation at wavelength $\lambda 1$, and transmissive to other wavelengths. The grating 92 is configured to be nontransmissive to radiation at wavelength $\lambda 2$, and transmissive to other wavelengths. The grating 93 is configured to be nontransmissive to radiation at wavelength $\lambda 3$, and transmissive to other wavelengths.

If an input signal 95 is introduced into the main waveguide 81, and includes components at a respective wavelengths $\lambda 1$, $\lambda 2$, $\lambda 3$, $\lambda 4$ and $\lambda 5$, the coupling portion 82 will separate out the component at wavelength $\lambda 1$, by routing it into waveguide 86, so that it appears at 96. The remaining components at wavelengths $\lambda 2$–$\lambda 5$ will be routed by the coupling portion 82 to continue traveling through the waveguide 81 to the coupling portion 83. The coupling portion 83 will cause the component at wavelength $\lambda 2$ to be routed into the waveguide 87, so that it appears at 97. The remaining components at wavelengths $\lambda 3$–$\lambda 5$ will be routed by the coupling portion 83 to continue traveling through the main waveguide 81 to the coupling portion 84. The coupling portion 84 will route the component at wavelength $\lambda 3$ into the waveguide 88, so that it appears at 98. The remaining signal components at wavelengths $\lambda 4$ and $\lambda 5$ will be routed by the coupling portion 84 to continue traveling along the main waveguide 81, as indicated at 99.

Figure 4:
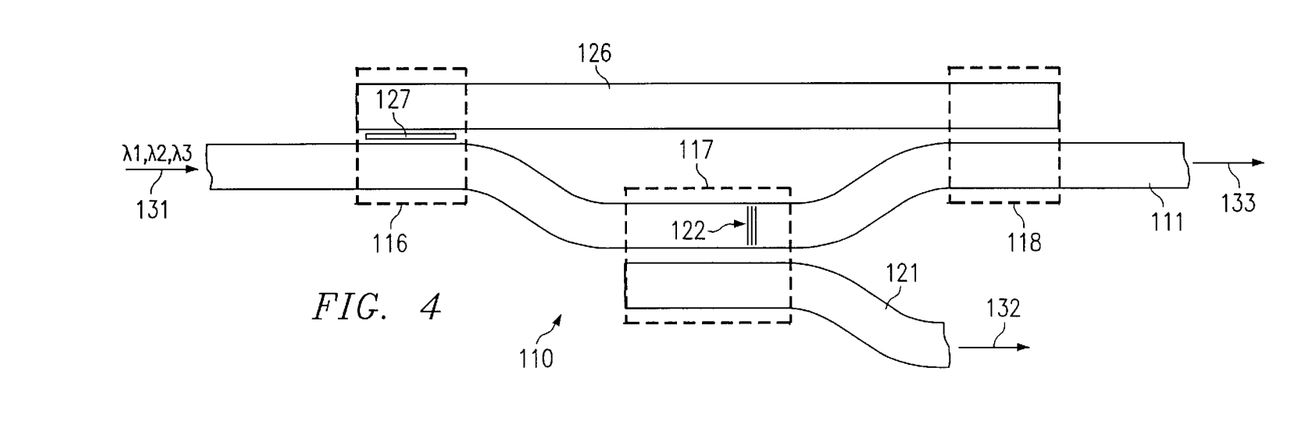
FIG. 4 is a diagrammatic fragmentary top view of an apparatus which is still another alternative embodiment of the apparatus of FIG. 1.

FIG. 4 is a diagrammatic fragmentary top view of an apparatus 110 which is yet another alternative embodiment of the apparatus 10 of FIG. 1. The apparatus 110 of FIG. 4 includes cladding material comparable to that shown at 12 in FIG. 1, but this cladding material has been omitted in FIG. 4 for clarity. The apparatus 110 of FIG. 4 includes a main waveguide 111, which has three successive coupling portions 116, 117 and 118 disposed at spaced locations therealong. The coupling portion 117 is associated with a further waveguide 121, and is structurally and functionally equivalent to the coupling portion shown at 26 in FIG. 1. It includes a Bragg grating 122 which is disposed within the waveguide 111.

The coupling portions 116 and 118 are each somewhat different from the coupling portion 117. They are each associated with a respective end of a further waveguide 126. The coupling portions 116 and 118 each lack a Bragg grating or equivalent structure. The coupling portions 116 and 118 each have a length in a direction of travel of radiation which is less than the length of the coupling portion 117. As a result, the coupling portion 116 is long enough to permit radiation to be coupled from the waveguide 111 into the waveguide 126, but is not long enough to permit that radiation to then be coupled from the waveguide 126 back into the waveguide 111. Similarly, the coupling portion 118 is long enough to permit radiation from the waveguide 126 to be coupled into the waveguide 111, but is not long enough to permit that radiation to be subsequently coupled from the waveguide 111 back into the waveguide 118.

The coupling portion 116 has, between the waveguides 111 and 126, a liquid crystal region 127 which is equivalent to the liquid crystal region 72 discussed above in association with FIG. 2. In particular, it can be electrically switched by a not-illustrated control circuit between two different states, in which it is respectively transmissive and nontransmissive to radiation at all wavelengths of interest.

With reference to the arrow 131 at the left side of FIG. 4, assume that optical radiation having three components at respective wavelengths $\lambda 1$, $\lambda 2$ and $\lambda 3$ is introduced into the left end of the waveguide 111. Also assume that the liquid crystal region 127 is in its nontransmissive state. The radiation introduced into the waveguide 111 at 131 will propagate through the coupling portion 116 without switching waveguides, and continue through the waveguide 111 until it reaches the coupling portion 117. Coupling portion 117 will separate and route the various signal components in a manner equivalent to that discussed above for the coupling portion 26 of FIG. 1, such that the component at wavelength $\lambda 1$ is routed to travel through the waveguide 121, as indicated by arrow 132, and the remaining components at wavelengths $\lambda 2$ and $\lambda 3$ are routed to travel through the waveguide 111, as indicated at 133.

Assume that the liquid crystal region 127 is now switched by the not-illustrated control circuit to its transmissive state. The coupling portion 116 will now cause all of the components at wavelengths $\lambda 1$–$\lambda 3$ to be coupled into and propagate through the waveguide 126, such that they bypass the coupling portion 117. When these component signals reach the coupling portion 118, they will all be coupled from the waveguide 126 back into the waveguide 111, and thus these components at wavelengths $\lambda 1$–$\lambda 3$ will all appear at 133. Since none of these components reach the coupling portion 117, none of these components will be routed into the waveguide 121, and thus none of them will be present at 132.

The apparatus 110 of FIG. 4 thus serves as a switch having first and second states. In the first state, the signal component at wavelength $\lambda 1$ is separated out and appears at 132, while signal components at all other wavelengths appear at 133. In the second state, all three component signals at wavelengths $\lambda 1$, $\lambda 2$ and $\lambda 3$ appear at 133, and no component signal appears at 132.

Figure 5:
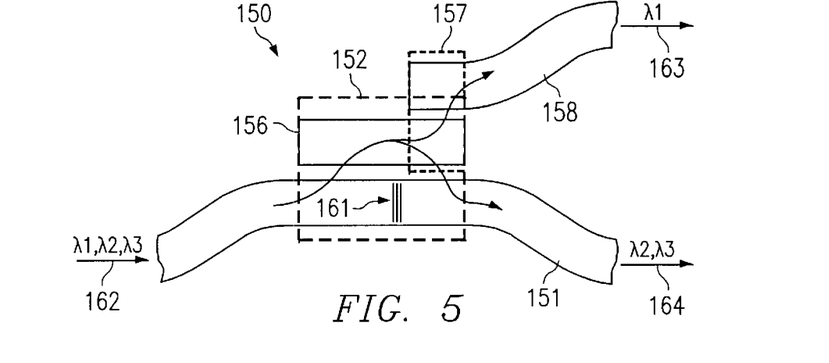
FIG. 5 is a diagrammatic fragmentary top view of an apparatus which is yet another alternative embodiment of the apparatus of FIG. 1.

FIG. 5 is a diagrammatic fragmentary top view of an apparatus 150 which is still another alternative embodiment of the apparatus 10 of FIG. 1. The apparatus 150 includes cladding material comparable to that shown at 12 in FIG. 1, but the cladding material has been omitted in FIG. 5 for clarity. The apparatus 150 includes a main waveguide 151, and a coupling portion 152 which can effect coupling between the waveguide 151 and a further waveguide 156. The waveguide 156 has a length which is equivalent to the length of the coupling section 152. A further coupling portion 157 can effect coupling between the waveguide 156 and a further waveguide 158.

The coupling portion 156 is structurally and functionally equivalent to the coupling portion 26 of FIG. 1, and includes a Bragg grating 161 which is equivalent to the grating shown at 36 in FIG. 1. The other coupling portion 157 has an effective length in the direction of the waveguides which is long enough to permit radiation traveling in the waveguide 156 to be coupled over into the waveguide 157, but which is too short to permit that radiation to thereafter be coupled back into the waveguide 156.

With reference to the arrow 162 at the left side of FIG. 5, assume that an optical signal is introduced into the left end of waveguide 151, and has three components at respective wavelengths $\lambda 1$, $\lambda 2$ and $\lambda 3$. When this optical signal reaches the coupling portion 152, the coupling portion 152 effects routing of component signals in a manner comparable to that described above for the coupling portion 26 of FIG. 1. In particular, the component signals at wavelengths $\lambda 1$ and $\lambda 2$ are coupled over into the waveguide 156, and then back into the waveguide 151, whereas the component at wavelength $\lambda 1$ is coupled from the waveguide 151 over into the waveguide 156, but is prevented by the grating 161 from being coupled back into the waveguide 151. Accordingly, the component at wavelength $\lambda 1$ continues propagating within the waveguide 156 until it reaches the coupling portion 157, where it is coupled from the waveguide 156 over into the waveguide 158. Thus, the component at wavelength $\lambda 1$ ends up traveling through the waveguide 158, as indicated by arrow 163, and the components at wavelengths $\lambda 2$–$\lambda 3$ end up traveling through the waveguide 151, as indicated by arrow 164.

Figure 6:
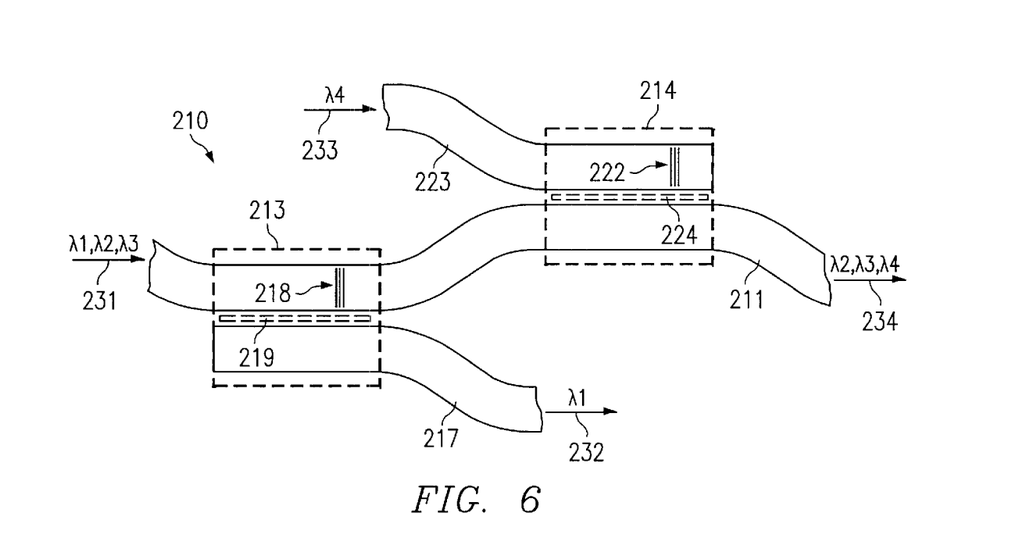
FIG. 6 is a diagrammatic fragmentary top view of a an apparatus which is a further alternative embodiment of the apparatus of FIG. 1.

FIG. 6 is a diagrammatic fragmentary top view of an apparatus 210 which is yet another alternative embodiment of the apparatus 10 of FIG. 1. The apparatus 210 includes cladding material similar to that shown at 12 in FIG. 1, but the cladding material has been omitted in FIG. 6 for clarity. The apparatus 210 of FIG. 6 is a device of a type commonly known as an optical add/drop multiplexer (OADM). The apparatus 210 includes a main waveguide 211, and two coupling portions 213 and 214 which are provided at spaced locations along the waveguide 211. The coupling portion 213 can effect coupling between the waveguide 211 and a further waveguide 217. The coupling portion 213 is structurally and functionally equivalent to the coupling portion shown at 26 in FIG. 1. In this regard, it includes a Bragg grating 218 disposed within the waveguide 211.

The other coupling portion 214 can effect coupling between the waveguide 211 and yet another waveguide 223. The waveguide 223 has an end surface at the right end of the coupling portion 214 in FIG. 6, and has a short distance from this end surface a Bragg grating 222. The Brag grating 222 is non-transmissive to radiation at a wavelength λ4, and is transmissive to radiation at other wavelengths. The coupling portion 214 has a length which is sufficient to permit radiation traveling in the waveguide 211 to be coupled over into the waveguide 223 and then back into the waveguide 211, but which is too short to permit that radiation to thereafter be coupled again from the waveguide 211 back into the waveguide 223.

The coupling portion 213 may optionally include between the waveguides 211 and 217 a liquid crystal region 219 comparable to the liquid crystal region 72 of FIG. 2. The coupling portion 214 may optionally include between the waveguides 211 and 223 a liquid crystal region 224 which is comparable to the liquid crystal region 72 of FIG. 2.

Assume initially that the liquid crystal regions 219 and 224 are both omitted from the apparatus 210. Further, and with reference to the arrow 231 at the left of FIG. 6, assume that an optical signal is introduced into the left end of the waveguide 211, and has three components at respective wavelengths of λ1, λ2 and λ3. This optical signal travels through the waveguide 211 until it reaches the coupling portion 213, where the various components are routed in a manner comparable to that described above for the coupling portion 26 of FIG. 1. In particular, the component at wavelength λ1 is coupled from the waveguide 211 over into the waveguide 217 and is then prevented from being coupled back into the waveguide 211 by the grating 218. It therefore continues along the waveguide 217, as indicated by arrow 232. In contrast, since the grating 218 is transmissive to other wavelengths, the components at wavelengths λ2 and λ3 are coupled from the waveguide 211 into the waveguide 217, and then from the waveguide 217 back into the waveguide 211, and thereafter continue along the waveguide 211 to the coupling portion 214.

An optical signal indicated by arrow 233 has a wavelength λ4, and is traveling through the waveguide 223. In the coupling portion 214, this optical signal is coupled from the waveguide 223 over into the waveguide 211, and would then tend to be coupled from the waveguide 211 back over into the waveguide 223, but the Bragg grating 222 will prevent the radiation at wavelength λ4 from being coupled back into the waveguide 223. Thus, waveguide 211 ends up carrying the components at wavelengths λ2, λ3 and λ4, as indicated by arrow 234.

Although the foregoing discussion explains that the waveguide 223 carries only one signal at wavelength λ4, it will be recognized that the waveguide 223 could alternatively carry several component signals at respective different wavelengths, and that all of these components could be coupled over into the waveguide 211. In that case, additional Bragg gratings would be provided within the waveguide 223 adjacent the Bragg grating 222, each Bragg grating in the waveguide 223 being nontransmissive to radiation at a respective different wavelength introduced into the waveguide 223 at 233.

In view of the discussion of the liquid crystal regions in preceding embodiments, it will be recognized that, if the liquid crystal region 219 is provided in the coupling portion 213, it can be used to selectively control whether or not the component signal at wavelength λ1 is routed into the waveguide 217 and appears at 232. Similarly, if the liquid crystal region 224 is provided in the coupling portion 214, it can be used to selectively control whether or not the component signal at wavelength λ4 is coupled from the waveguide 223 over into the waveguide 211, and thus whether or not this component signal appears at 234.

Figure 7:
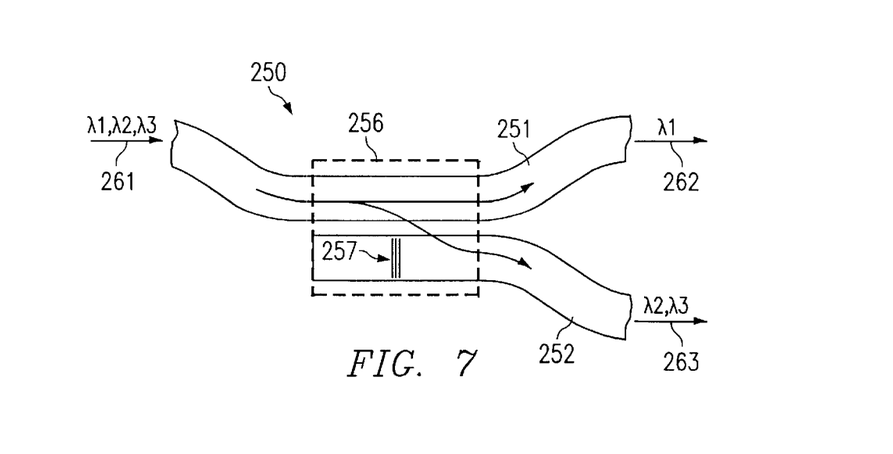
FIG. 7 is a diagrammatic fragmentary top view of an apparatus which is yet another alternative embodiment of the apparatus of FIG. 1.

FIG. 7 is a diagrammatic fragmentary top view of an apparatus 250 which is still another alternative embodiment of apparatus 10 of FIG. 1. The apparatus 250 includes cladding material comparable to that shown at 12 in FIG. 1, but the cladding material has been omitted in FIG. 7 for clarity. The apparatus 250 includes two waveguides 251 and 252, and a coupling portion 256 which effects coupling between respective portions of the two waveguides 251 and 252. At first glance, the coupling portion 256 appears to be similar to the coupling portion 26 of FIG. 1. However, there are two significant differences.

First, although the coupling portion 256 includes a Bragg grating 257, the grating 257 is not provided within the waveguide 251 through which radiation travels to the coupling portion 256, but instead is in other waveguide 252. The grating 257 is configured to be nontransmissive to radiation at wavelength λ1, and to be transmissive to radiation at other wavelengths, including wavelengths λ2 and λ3. A second difference is that the coupling portion 256 has a length in the direction of travel of radiation which is long enough to permit coupling of radiation from the waveguide 251 over into the waveguide 252, but is too short to permit that radiation to be coupled from the waveguide 252 back into the waveguide 251.

With reference to the arrow 261 on the left side of FIG. 7, assume that an optical signal is introduced into the left end of the waveguide 251, and has three components at respective wavelengths of λ1, λ2 and λ3. This composite signal will travel through the waveguide 251 to the coupling portion 256. Since the grating 257 is nontransmissive to radiation at wavelength λ1, the component at wavelength λ1 will be prevented from being coupled from the waveguide 251 over into the waveguide 252. Thus, the component signal at wavelength λ1 will continue along the waveguide 251, as indicated at 262. On the other hand, the grating 257 is transmissive to the component signals at wavelengths λ2 and λ3, and these component signals will thus be coupled from the waveguide 251 over into the waveguide 252 within the coupling portions 256. However, since the coupling portion 256 is too short for them to thereafter be coupled back into the waveguide 251, they will continue on through the waveguide 252, as indicated by arrow 263.

Figure 8:
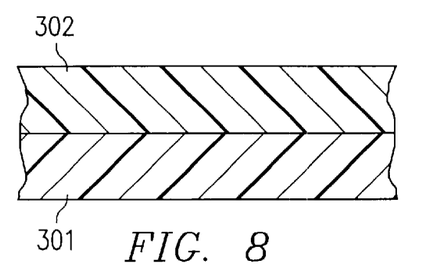
FIGS. 8–10 are diagrammatic sectional views that show successive steps in a process which embodies the present invention and which can be used to fabricate the apparatus of FIG. 1.
Figure 9:
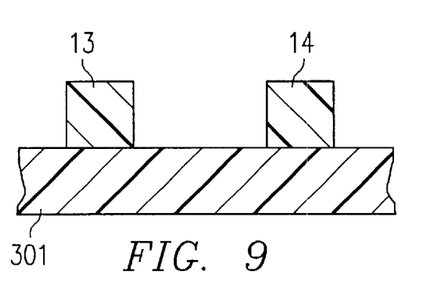
Figure 10:
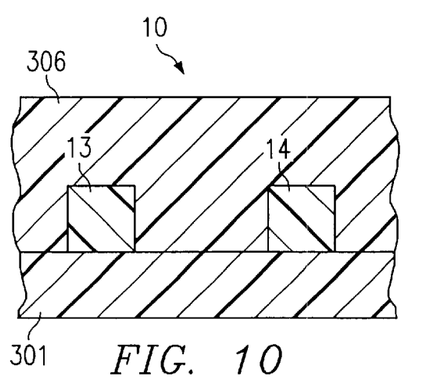

FIGS. 8–10 are diagrammatic sectional views showing successive steps in a inexpensive process for making the apparatus 10 of FIG. 1. The sectional view of FIG. 10 corresponds to the section line 10–10 in FIG. 1. With reference to FIG. 8, a planar substrate 301 is provided, and is made of a glass or polymer material of a type known to persons skilled in the art. The substrate 301 has an index of refraction which would be suitable for the cladding material 12 of FIG. 1, because the substrate 301 will ultimately become part of the cladding material, as discussed below.

A layer 302 is then formed on top of the substrate 301, for example through deposition or by spinning it on. The layer 302 is made of a glass or polymer material of a type known to persons skilled in the art. The layer 302 has an index of refraction which would be suitable for the core material of the waveguides 13 and 14 of FIG. 1, because the waveguides 13 and 14 will be formed from the layer 302, as discussed below.

More specifically, a patterned etch using known techniques is carried out on the layer 302, in order to selectively remove material of the layer 302 other than the portions thereof which will serve as the waveguides 13 and 14. Following this etch procedure, the waveguides 13 and 14 are left on top of the substrate 301, as shown in FIG. 9.

Next, patterned photolithography is carried out on the waveguide 13 using a technique well known in the art, in order to form therein the Bragg grating 36 (FIG. 1). This known technique involves applying a photomask and then directing radiation from an ultraviolet laser onto the waveguide 13 through the mask, the mask distributing the laser light in a periodic way that changes molecular bonds in the core material so as to produce the grating 36. Thereafter, a cladding overcoat 306 is applied over the structure shown in FIG. 9, in order to obtain the apparatus 10 shown in FIG. 10. The cladding overcoat 306 may be applied through deposition, or by spinning it on. In the disclosed embodiment the overcoat 306 is made of the same material as the substrate 301. The substrate 301 and overcoat 306 thus together serve as cladding 12 (FIG. 1) for the core material which serves as the waveguides 13 and 14.

Figure 11:
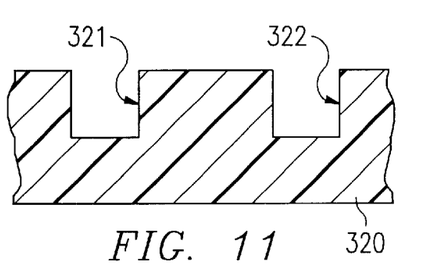
FIGS. 11–13 are diagrammatic sectional views that show successive steps in a different process which embodies the present invention and which can be used to fabricate the apparatus of FIG. 1.

FIGS. 11–13 are diagrammatic sectional views showing successive steps in an inexpensive process which is an alternative embodiment of the process discussed above in association with FIGS. 8–10. In this regard, FIG. 11 shows a glass or polymer substrate 320, which can be made of the same material discussed above for use as the layer 301 in FIG. 8. The substrate 320 thus has characteristics, including an appropriate index of refraction, that make it suitable for use as a cladding material. Grooves 321 and 322 are formed therein, so as to open into the substrate 320 from a top surface thereof. The grooves 321 and 322 correspond in size and shape to the waveguides shown at 13 and 14 in FIG. 1. The grooves 321 and 322 are formed by etching the substrate 320, or by embossing the top surface of the substrate 320 in association with the application of heat, for example through a hot rolling process.

Figure 12:
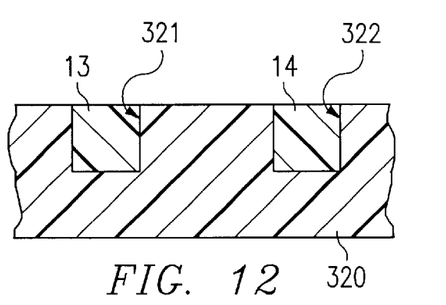

Subsequently, the grooves 321 and 322 in the substrate 320 are filled with a different glass or polymer material, which can be the same material discussed above for use as the layer 302 in FIG. 8. The glass or polymer material in the grooves 321 and 322 thus has characteristics, including an appropriate index of refraction, which make it suitable for use as the core material of a waveguide, and in fact the material in the grooves 321 and 322 will serve as the waveguides 13 and 14. The top surface of the resulting structure may be planarized using a known planarization technique, in order to remove any excess core material which is not disposed within the grooves.

Figure 13:
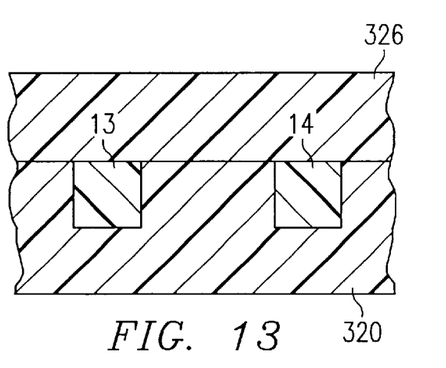

Then, the Bragg grating 36 (FIG. 1) is formed within the waveguide 13 using patterned photolithography, in a manner similar to that described above in association with FIG. 9. Then, a cladding overcoat 326 is applied over the resulting structure, as shown in FIG. 13. In the disclosed embodiment, the overcoat 326 is the same glass or polymer material as the substrate 320, and can be applied through deposition, or by spinning it on. The substrate 320 and overcoat 326 together serve as cladding for the core material that serves as the waveguides 13 and 14.

In each of the devices discussed above, an optical input or output fiber can be coupled directly to any of the disclosed waveguides, for example by simply fusing it to an end of the core material of that waveguide using a known laser fusing technique. This avoids the need to use collimating optics or other complex optical or mechanical assemblies.

The present invention provides a number of technical advantages. One such technical advantage is the provision of a simple approach for using waveguides in combination with structure such as Bragg gratings to effect wavelength separation. This facilitates use of technologies such as dense wavelength division multiplexing (DWDM), while avoiding problems of complexity and alignment that are present in other existing approaches. The complexity and alignment issues in existing arrangements also tend to cause relatively high optical losses, whereas the present invention is not only simple, but permits optical losses be minimized.

A further advantage is that the present invention performs all processing directly on optical signals, thereby avoiding any need to convert optical signals to electrical signals, process the electrical signals, and then convert the electrical signals back into optical signals. Conversions between electrical and optical signals are slow, and by avoiding these conversions the invention provides faster throughput.

A further advantage of the present invention results from the use of switching sections made from electro-optical materials such as liquid crystal material, lithium niobate, or the like, which permit inherent processing of optical signals to be carried out in a selective manner, for example to implement addressable or reconfigurable optical routers or add/drop multiplexers. As a result, for some materials, the present invention can achieve a relatively fast response time of approximately one microsecond or less, which is significantly faster than certain other existing techniques for optical switching, such as those which use bubbles, micro-electro-opto-mechanical devices (MEMS), or liquid crystal material with a different opto-mechanical structure.

Still another advantage is that fibers can be directly coupled to the devices of the present invention, for example by fusing, without the need for collimating optics or other complex assemblies. Still another advantage is that the present invention provides devices that can be produced in a simple and rapid manner in high volume, using techniques and equipment which are similar to those used for semiconductor wafer processing.

Although several selected embodiments have been illustrated and described in detail, it will be understood that various substitutions and alterations are possible without departing from the spirit and scope of the present invention, as defined by the following claims.

What is claimed is:

1. An apparatus, comprising: first and second waveguides, and a coupling portion operable to cause radiation at a first wavelength which is traveling in a direction of travel through said first waveguide and which reaches said coupling portion to be routed so as to be traveling in one of said first and second waveguides when exiting said coupling portion, and to cause radiation at a second wavelength different from said first wavelength which is traveling through said first waveguide in said direction of travel and which reaches said coupling portion to be routed so as to be traveling in the other of said first and second waveguides when exiting said coupling portion, said coupling portion including said first and second waveguides respectively having first and second portions that extend approximately parallel to each other and that are sufficiently close for a sufficient distance to permit coupling therebetween of radiation having at least one of said first and second wavelengths, and including structure operable along at least part of said distance to frustrate coupling between said first and second portions of radiation having one of said first and second wavelengths while permitting coupling between said first and second portions of radiation having the other of said first and second wavelengths.

2. An apparatus according to claim 1, wherein said structure is provided within one of said first and second waveguides.

3. An apparatus according to claim 2, wherein said structure includes a Bragg grating.

4. An apparatus according to claim 2,
wherein said structure is provided within said first waveguide;
wherein said one wavelength is said second wavelength and said other wavelength is said first wavelength;
wherein said radiation at said first wavelength is routed to continue traveling through said first waveguide; and
wherein said radiation at said second wavelength is routed to continue traveling through said second waveguide.

5. An apparatus according to claim 4, wherein said structure within said first waveguide includes a Bragg grating.

6. An apparatus according to claim 4, wherein said distance is sufficiently long to facilitate coupling of radiation from said first portion to said second portion, but is too short to facilitate subsequent coupling of that radiation from said second portion back to said first portion.

7. An apparatus according to claim 2,
wherein said structure is provided within said second waveguide;
wherein said one wavelength is said first wavelength and said other wavelength is said second wavelength;
wherein said radiation at said first wavelength is routed to continue traveling through said first waveguide; and
wherein said radiation at said second wavelength is routed to continue traveling through said second waveguide.

8. An apparatus according to claim 7, wherein said structure within said second waveguide includes a Bragg grating.

9. An apparatus according to claim 7, wherein said distance is sufficiently long to facilitate coupling of radiation from said first portion to said second portion and then from said second portion back to said first portion, but is too short to facilitate subsequent coupling of that radiation from said first portion back to said second portion.

10. An apparatus according to claim 1, including a switching section which is provided between said first and second portions along at least part of said distance, and which can be selectively switched between first and second operational states in which said switching section respectively permits and inhibits coupling between said first and second portions of radiation at either of said first and second wavelengths.

11. An apparatus according to claim 10, wherein said structure includes a Bragg grating.

12. An apparatus according to claim 11, wherein said Bragg grating is disposed within one of said first and second waveguides.

13. An apparatus according to claim 1, including a third waveguide having a third portion which extends approximately parallel to a selected one of said first and second portions along at least part of the length thereof, and which is sufficiently close to said selected one of said first and second portions for a sufficient distance so as to permit coupling from said one of said first and second portions to said third portion of the radiation traveling within said one of said first and second portions.

14. An apparatus according to claim 1,
including a third waveguide having third and fourth portions at spaced locations therealong;
wherein said first waveguide has fifth and sixth portions which are disposed on opposite sides of and are each spaced from said first portion;
wherein said third and fifth portions extend approximately parallel to each other and are sufficiently close for a sufficient distance to permit coupling from said fifth portion to said third portion of radiation having either of said first and second wavelengths;
wherein said fourth and sixth portions extend approximately parallel to each other and are sufficiently close for a sufficient distance to permit coupling from said fourth portion to said sixth portion of radiation having either of said first and second wavelengths; and
including a switching section which is provided between said third and fifth portions and which can be selectively switched between first and second operational states in which said switching section respectively permits and inhibits coupling between said third and fifth portions of radiation at either of said first and second wavelengths.

15. An apparatus according to claim 1,
including a third waveguide having a third portion;
wherein one of said first and second waveguides has a fourth portion at a location therealong spaced from said first and second portions; and
wherein said third and fourth portions extend approximately parallel to each other and are sufficiently close for a sufficient distance to permit coupling from said third portion to said fourth portion of radiation at a selected wavelength traveling through said third waveguide.

16. A method, comprising the steps of:
providing a first layer made of a material which has a first index of refraction;
forming on said first layer first and second elongate sections made of a second material which is transmissive to radiation of a predetermined wavelength and which has a second index of refraction different from said first index of refraction; and
forming over said elongate sections and exposed portions of said first layer a third layer made of a material which has a third index of refraction different from said second index of refraction;
wherein said elongate sections function as cores of respective waveguides, and said materials of said first and second layers function as cladding for said cores.

17. A method according to claim 16, wherein said step of forming said elongate sections includes the steps of:
forming on said first layer a second layer made of said material with said second index of refraction; and
thereafter selectively removing material from said second layer so as to leave at least said two elongate sections.

18. A method according to claim 16, wherein said step of forming said elongate sections includes the steps of:
selectively removing material from said first layer to define elongate grooves therein which each correspond to a respective one of said elongate sections; and
thereafter filling said grooves with said material with said second index of refraction.

19. A method according to claim 16, wherein said step of forming said elongate sections is carried out in a manner so that said first and second elongate sections respectively include first and second portions that extend approximately parallel to each other and that are sufficiently close for a sufficient distance to permit coupling therebetween of radiation.

20. A method according to claim 19, including the step of forming structure operable along at least part of said distance to frustrate coupling between said first and second portions of radiation having one of first and second wavelengths while permitting coupling between said first and second portions of radiation having the other of said first and second wavelengths.

21. A method according to claim 20, wherein said step of forming structure includes the step of forming a Bragg grating within one of said first and second elongate sections.

22. A method according to claim 16, including the step of selecting said first index of refraction to be substantially equal to said third index of refraction.

23. A method according to claim 22, including the step of using the same material to form each of said first and third layers.

24. A method according to claim 16, wherein said first, second and third layers are each made from one of a glass material and a polymer material.

* * * * *